( 12 ) United States Patent
Wu (10) Patent No.: US 8,880,499 B1
(45) Date of Patent: Nov. 4, 2014

(54) PERSONALIZING AGGREGATED NEWS CONTENT

(75) Inventor: Chung Wu, East Palo Alto, CA (US)

(73) Assignee: Google Inc., Mountain View, CA (US)

( * ) Notice: Subject to any disclaimer, the term of this patent is extended or adjusted under 35 U.S.C. 154(b) by 996 days.

(21) Appl. No.: 11/319,219

(22) Filed: Dec. 28, 2005

(51) Int. Cl.
*G06F 7/00* (2006.01)
*G06F 17/30* (2006.01)

(52) U.S. Cl.
USPC ........................................... 707/710

(58) Field of Classification Search
USPC ........................................... 707/710
See application file for complete search history.

(56) References Cited

U.S. PATENT DOCUMENTS

| | | | |
|---|---|---|---|
| 7,596,558 B2 * | 9/2009 | Brewer et al. ................ | 1/1 |
| 2002/0010757 A1 * | 1/2002 | Granik et al. ................ | 709/218 |
| 2002/0194585 A1 * | 12/2002 | Connelly ..................... | 725/9 |
| 2003/0203731 A1 * | 10/2003 | King et al. ................... | 455/407 |
| 2004/0068486 A1 * | 4/2004 | Chidlovskii ................. | 707/3 |
| 2005/0033657 A1 * | 2/2005 | Herrington et al. ........... | 705/26 |
| 2005/0060312 A1 * | 3/2005 | Curtiss et al. ................ | 707/7 |
| 2005/0154996 A1 * | 7/2005 | Othmer ....................... | 715/774 |
| 2005/0165742 A1 * | 7/2005 | Chin .......................... | 707/3 |
| 2005/0165743 A1 * | 7/2005 | Bharat et al. ................. | 707/3 |
| 2005/0216457 A1 * | 9/2005 | Walther et al. ............... | 707/4 |
| 2005/0278297 A1 * | 12/2005 | Nelson ........................ | 707/1 |
| 2006/0026147 A1 * | 2/2006 | Cone et al. ................... | 707/3 |
| 2006/0047701 A1 * | 3/2006 | Maybury et al. .............. | 707/104.1 |
| 2007/0100797 A1 * | 5/2007 | Thun et al. ................... | 707/3 |
| 2007/0214154 A1 * | 9/2007 | Ducatel et al. ............... | 707/100 |

OTHER PUBLICATIONS

Haake, The Individualized Eletronic Newspaper: an example of an active publication, Electronic Publishing, Jun. 1994, pp. 89-111.*

* cited by examiner

*Primary Examiner* — Kimberly Wilson
(74) *Attorney, Agent, or Firm* — Harrity & Harrity, LLP

(57) ABSTRACT

A system customizes a news document associated with a user of a news aggregation service. The system includes a remote news aggregation server configured to create a news aggregation service document based on a request received from the user. The remote news aggregation server identifies news content from a plurality of news source servers based on the received request and presents the identified news, content in the news aggregation service document. The remote news aggregation server is further configured to receive a request from the user to remove a news item from the presented news content and removing the requested news item from the identified news content. Updated news content is presented in an updated news aggregation service document.

25 Claims, 8 Drawing Sheets

PERSONALIZING AGGREGATED NEWS CONTENT

BACKGROUND

1. Field of the Invention

Implementations consistent with the principles of the invention relate generally to information aggregation systems and, more particularly, to personalization of news content aggregated by a news aggregation service.

2. Description of Related Art

Existing content aggregation services (e.g., Google News) search out, and aggregate, news, blogs, RSS (real simple syndication) feeds and other content published on web pages throughout the Internet. Specifically relating to news aggregation services, in response to a search query from a user, or when a user browses a newspaper section of the news aggregation service, the news aggregation service presents a list of stories, from the aggregated news content, relevant to the query or to the newspaper section requested, with each story involving a group of articles from different publications dealing with the same topic. To keep abreast of developments in the news, users must periodically access the news aggregation service, re-enter a search query and view relevant news stories.

SUMMARY

According to one aspect consistent with the principles of the invention, a method may include fetching news content from a plurality of news source servers; aggregating the news content; presenting the aggregated news content to a user; receiving a request to remove a news item from the aggregated news content; and presenting updated aggregated news content, where the requested news item has been removed.

According to another aspect, a system may include a news aggregation server to: create a news aggregation service document based on a request received from a user, identify news content from a plurality of news source servers based on the received request, present the identified news content in the news aggregation service document, receive a request from the user to remove a news item from the news aggregation service document, remove the requested news item from the news aggregation service document based on the received request, to form an updated news aggregation service document, and present the updated news aggregation service document.

According to a further aspect, a news aggregation server is provided. The news aggregation server may include a memory configured to store instructions and news content and a processing unit to execute the instructions in memory to index news content from a number of news source servers, receive a request for a news aggregation service document from a user, aggregate news content from the memory based on the received request, where the news content includes a plurality of news items, present the aggregated news content to the user in the news aggregation service document, receive a request to remove a selected news item from the news aggregation service document, remove the selected news item from the news aggregation service document, retrieve a replacement news item from the memory, and present an updated news aggregation service document to the user, the updated news aggregation service document including the replacement news item.

According to yet another aspect consist with principles of the invention, a method may include aggregating news content from a news source server; ranking the aggregated news content; presenting the ranked, aggregated news content to a user; receiving a request to archive a news item from the aggregated news content; removing the requested news item from the aggregated news content to form updated aggregated news content; re-ranking the updated, aggregated news content based on the received archive request; and presenting the re-ranked, updated aggregated news content to the user.

According to still another aspect, a system may include a news aggregation server to index news content from a plurality of news source servers, receive a request for a news aggregation service document from a user, aggregate the indexed news content based on the received request, determine when a news item in the news content has been previously accessed by the user, remove the previously accessed news item from the aggregated news content, and presenting the aggregated, indexed news content to the user in the news aggregation service document.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Consistent with principles of the invention, a news aggregation service may acknowledge previously viewed or undesirable news content. Additional available news content may be presented to the user based on the content of the previously viewed or undesirable news content. In this manner, news content provided by the news aggregation service remains persistently fresh and desirable.

A "document," as the term is used herein is to be broadly interpreted to include any machine-readable and machine-storable work product. A document may include an e-mail, a web site, a file, a combination of files, one or more files with embedded links to other files, a news group posting, a news article, a blog, a web advertisement, etc. In the context of the Internet, a common document is a web page. Documents often include textual information and may include embedded information (such as meta information, images, hyperlinks, etc.) and/or embedded instructions (such as Javascript, etc.).

Overview

Figure 1:
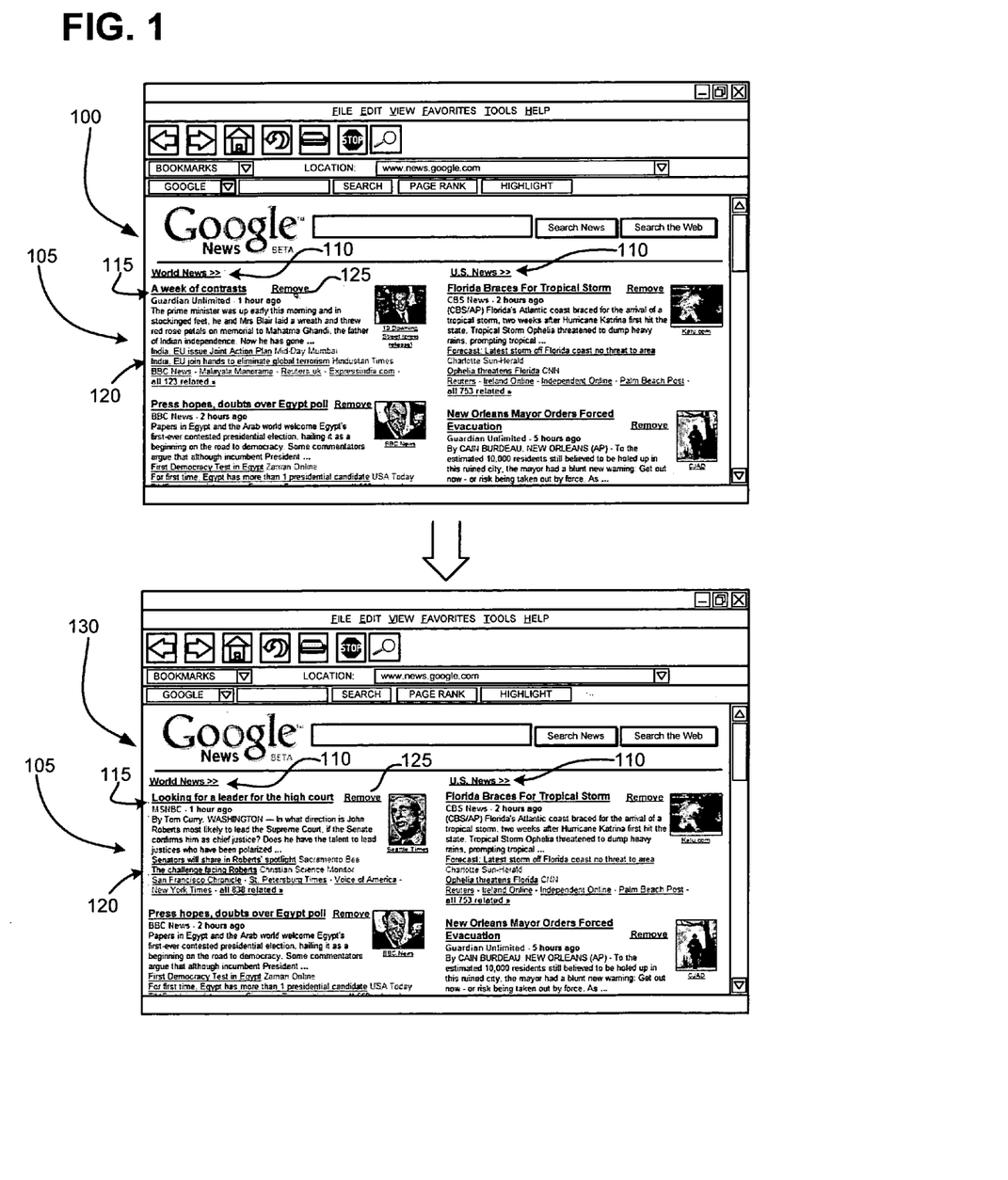
FIG. 1 is a diagram of an overview of an implementation of the invention.

FIG. 1 illustrates an exemplary overview of an implementation of the invention that receives a user indication that a particular news content document has been previously viewed or accessed or is considered undesirable and, in response, provides a refreshed listing of news content for subsequent perusal. As shown in FIG. 1, an initial news aggregation service web document 100 may be presented to a user. News aggregation service web document 100 may be populated in response to a general news request, a specific news query, or in response to previously received news content customization criteria. Regardless of the manner of population, news aggregation service web document 100 may include a listing or set 105 of relevant news content documents. In one implementation, document set 105 may be broken down into news categories 110, with each category 110 having one or more news content documents referenced within document set 105. In an even more specific embodiment, a representative news content document 115 may be emphasized in document set 105, followed by additional references 120 relating to news content documents relating to a similar topic. Representative news content document 115 as well as additional references 120 may include a headline and/or brief description of the relative document as well as a hyperlink to a complete copy of the document.

In accordance with principles of the invention, each representative news content document 115 may include an associated hyperlink 125 or other suitable user selection mechanism for receiving an indication (e.g., a "click") that the user no longer wishes to view the particular document 115. In response to a user selection of link 125, a subsequent news aggregation service web document 130 may be presented to the user. As shown, document set 105 included within subsequent news aggregation service web document 130 no longer includes the document associated with the selected link 125. Further, in one implementation consistent with principles of the invention, news content documents related to the document associated with the selected link 125 may also be removed from document set 105.

Exemplary Network Configuration

Figure 2:
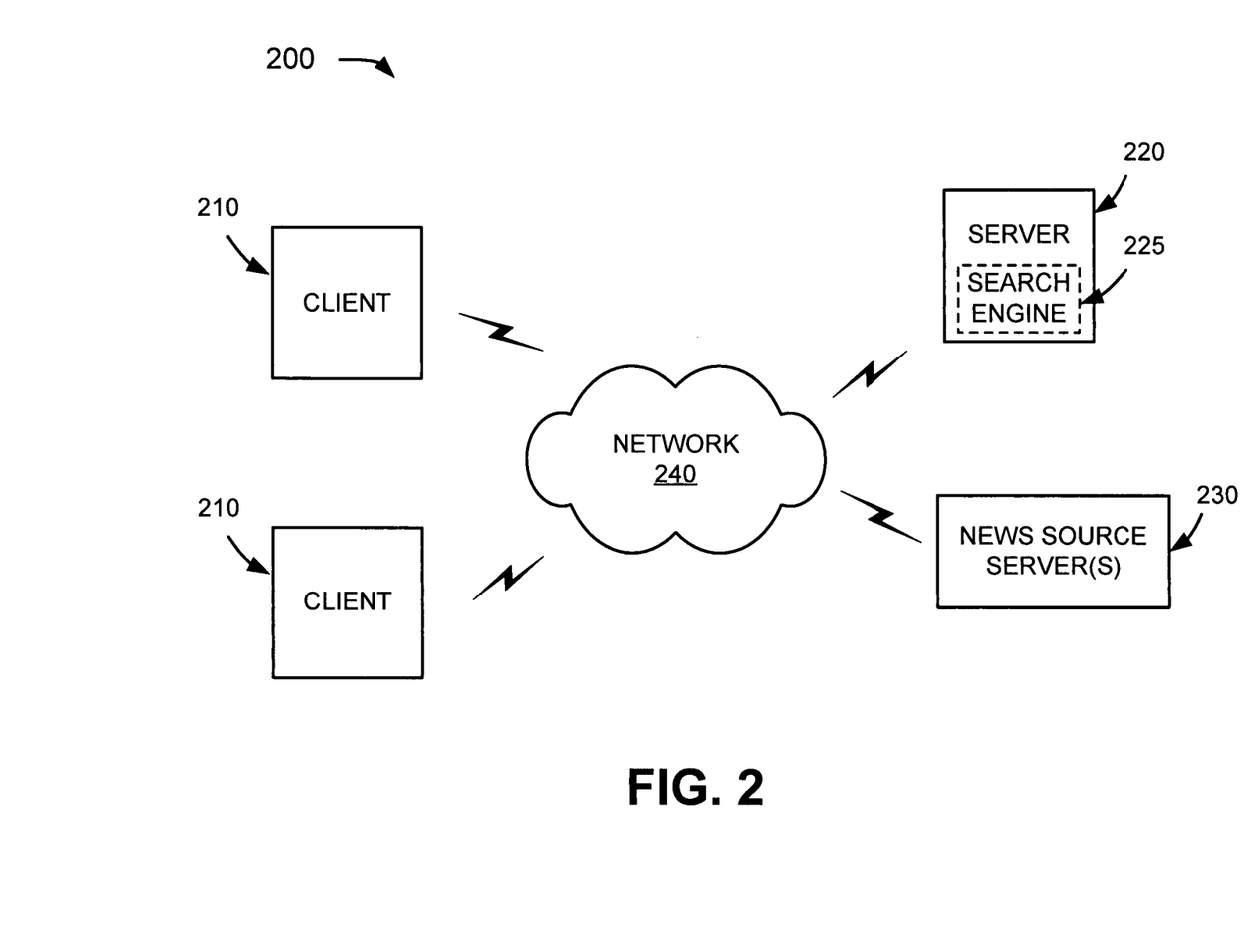
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to one or more servers 220-230 via a network 240. Two clients 210 and two servers 220-230 have been illustrated as connected to network 240 for simplicity. In practice, there may be more or fewer clients and servers. Also, in some instances, a client may perform one or more functions of a server and a server may perform one or more functions of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220 and 230 may include server entities that access, fetch, aggregate, process, search, and/or maintain documents in a manner consistent with the principles of the invention. Clients 210 and servers 220 and 230 may connect to network 240 via wired, wireless, and/or optical connections.

In an implementation consistent with the principles of the invention, server 220 may include a search engine 225 usable by users at clients 210. Server 220 may implement a news aggregation service by crawling a corpus of news content documents (e.g., web pages) hosted on news source server(s) 230, indexing the news content documents, and storing information associated with these news content documents in a repository of crawled documents. The news aggregation service may be implemented in other ways, such as by agreement with the operator(s) of news source server(s) 230 to distribute their news content documents via the news aggregation service. Search engine 225 may execute a search based on a query, received from a user at a client 210, on the corpus of news documents stored in the repository of crawled documents. Server 220 may provide, to a user issuing the query, options to enable the user to remove or archive news content, as described below.

News source server(s) 230 may store or maintain news content documents that may be crawled by server 220. Such news content documents may include recently published news stories, or older (i.e., not recent), archived news stories from any type of news source, such as, for example, the Washington Post, the New York Times, Time magazine, or Newsweek.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

Exemplary Client/Server Architecture

Figure 3:
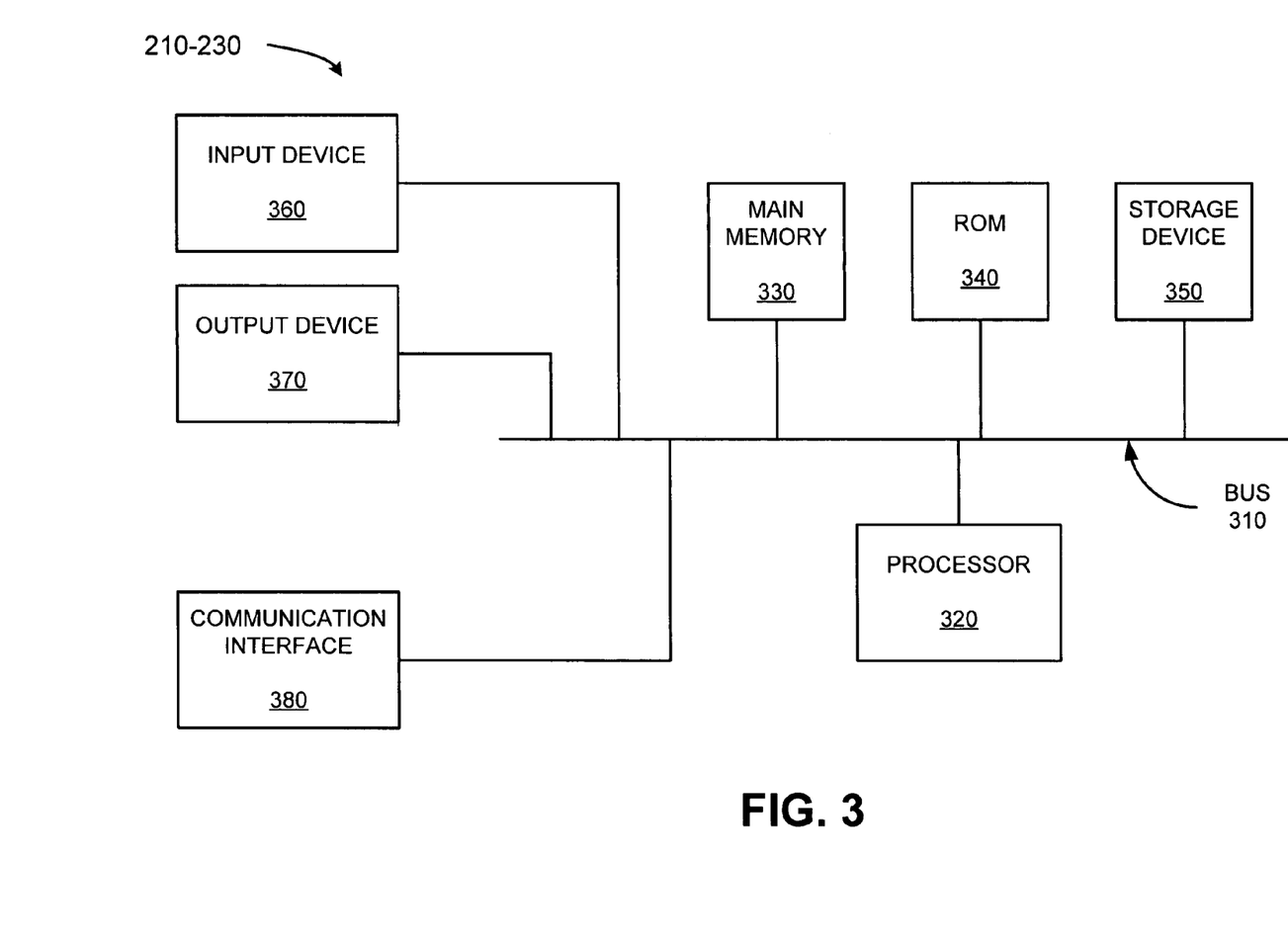
FIG. 3 is an exemplary diagram of a client and/or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-230, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 4A:
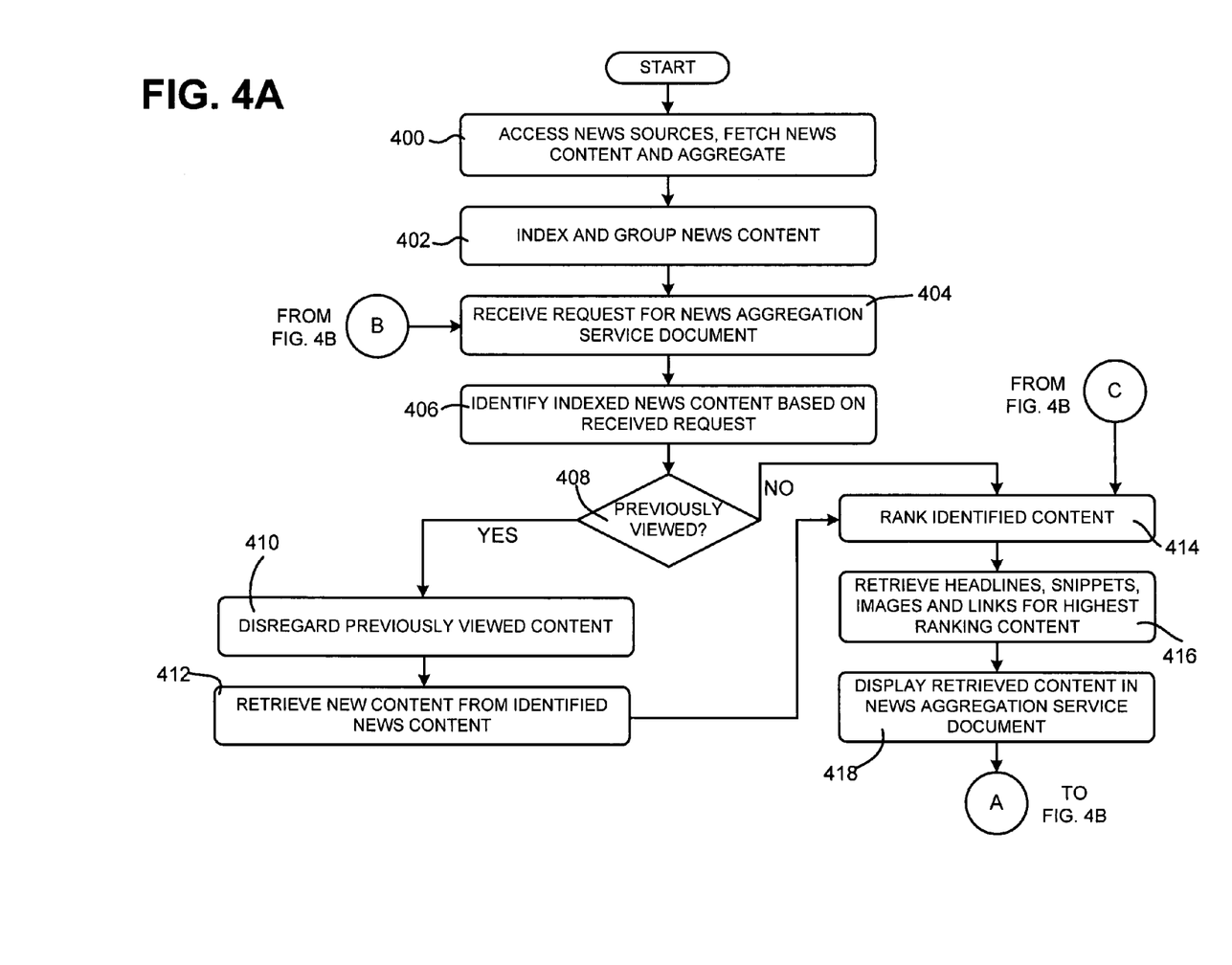
FIGS. 4A and 4B are flowcharts illustrating exemplary processing for creating and updating a news aggregation service document according to an implementation consistent with the principles of the invention.
Figure 4B:
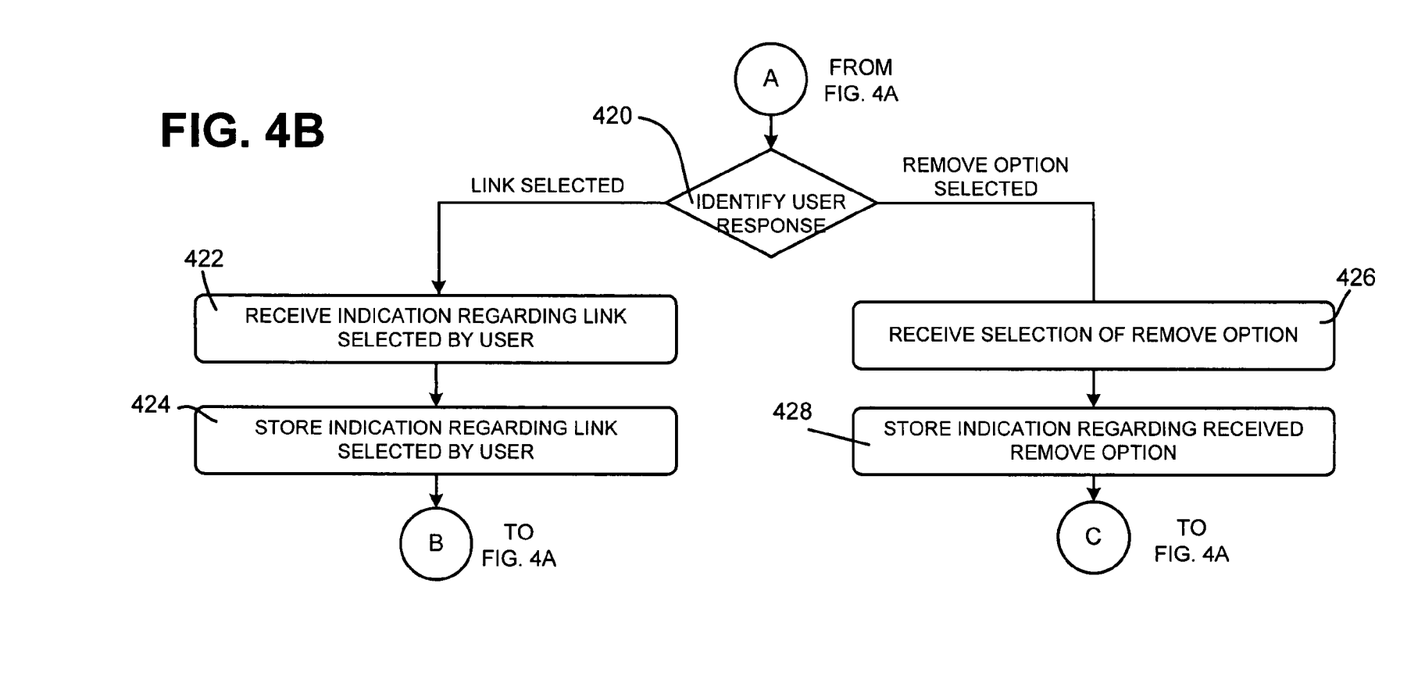

FIGS. 4A and 4B are flowcharts of exemplary processing for creating and updating a news aggregation service document according to one implementation consistent with the principles of the invention. As one skilled in the art will appreciate, the processing exemplified by FIGS. 4A and 4B may be implemented in software and stored on a computer-readable memory, such as main memory 330, ROM 340 or storage device 350 of server 220. Alternatively, the processing exemplified by FIGS. 4A and 4B may be implemented in hardwired circuitry, such as combinational logic, within server 220.

Turning to FIG. 4A, processing may begin with server 220 accessing external news content (e.g., from server(s) 230), fetching the news content and aggregating the fetched news content (act 400). For example, server 220 may use a news crawler (e.g., a web robot) that may access news content documents hosted by news source server(s) 230. News source server(s) 230 may host, for example, news content from the Washington Post, the New York Times, or other news content sites. The fetched news content may then be indexed and grouped, using conventional indexing and grouping algorithms (act 402).

Server 220 may then receive a user request for a news aggregation service document meeting one or more criteria (act 404). In one implementation, the received criteria may indicate that the user wishes to access a generalized news content page. Alternatively, the user request may include a query indicating certain keywords to be contained within the retrieved content to indicate the types of content desired by the user. Server 220 may then search the indexed news content based on the received request to identify news content meeting the submitted criteria (act 406).

In accordance with principles of the invention, it is then determined whether any identified news content matches news content previously accessed by the user or matches news content "removed" by the user from a previous version of the news aggregation service document (act 408). If so, the previously accessed or removed content, and possibly related news content, may be disregarded (act 410), and new content matching the user request may be retrieved from the identified news content (act 412).

If none of the identified news content has been previously accessed or removed, the process proceeds directly to act 414, where the identified content is ranked based on various criteria, such as freshness, user preference, etc. In one implementation consistent with principles of the invention, indications regarding whether content was previously accessed or removed may be used to rank the identified content. For example, "removed" content may result in similar or related news content receiving a reduced ranking. Following ranking of the identified news content, headlines, snippets, images and/or links to the highest ranking matching content may be retrieved (act 416) and presented to the user in a news aggregation service document (act 418).

Figure 5:
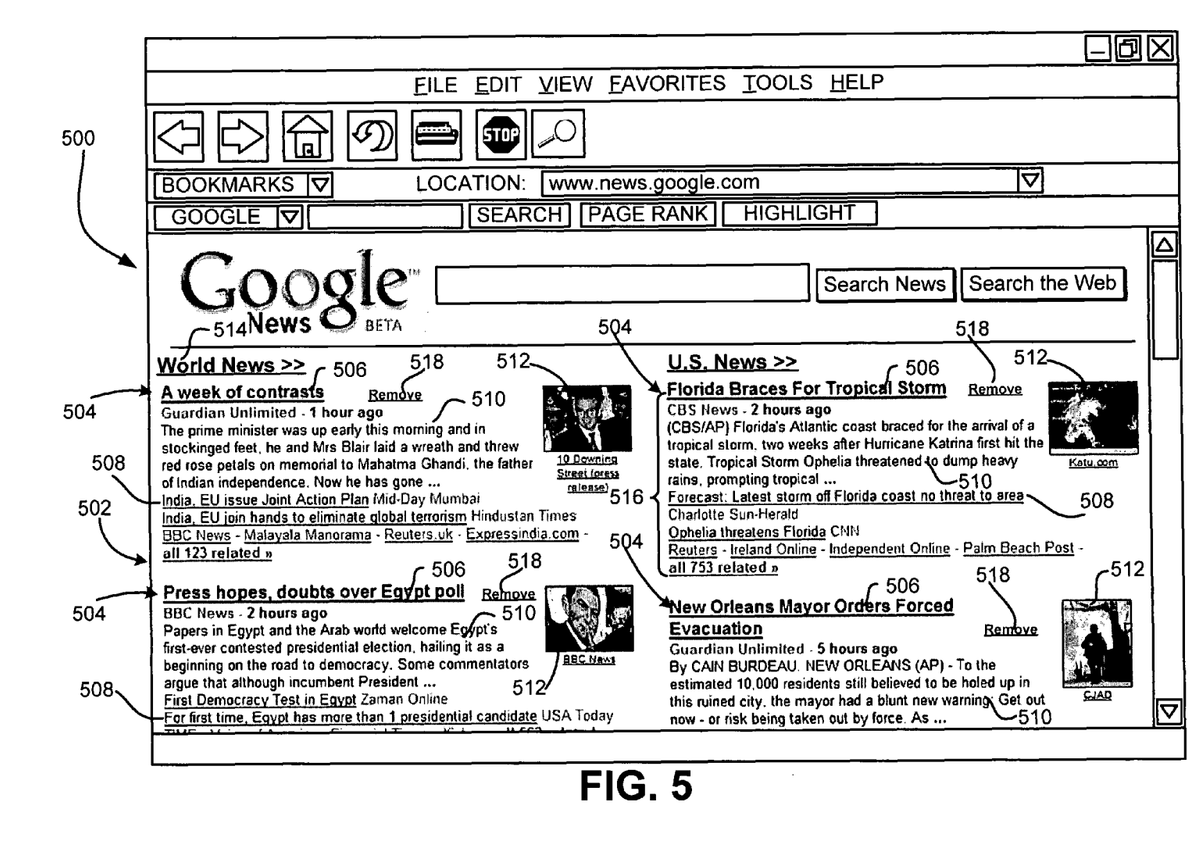
FIG. 5 is a diagram of an exemplary news aggregation service document according to an implementation consistent with the principles of the invention.

FIG. 5 is a diagram of an exemplary news aggregation service document 500 according to an implementation consistent with the principles of the invention. As with news aggregation service document 100 of FIG. 1, initial news aggregation service document 500 may include a set 502 of news content listings 504 matching the received criteria. In one exemplary implementation, news aggregation service document 500 may be a web page that includes a series of hypertext links 506 associated with the identified news content listings 504 as well as headlines 508, snippets 510 and/or images 512 relating to listings 504. Furthermore, news aggregation service document 500 may also include a number of categories 514, and groupings 516 for displaying related news content listings together.

In addition to the above information, each news content listing 504, category 514, or grouping 516 provided on news aggregation service document 500 may also include a "remove" option 518 for enabling users to delete or otherwise remove the associated news content from news aggregation service document 500. Upon selection of remove option 518, as will be described in additional detail below, a subsequent news aggregation service document 500 may be provided that does not include the "removed" content.

Referring to FIG. 4B, subsequent to presentation of an initial news aggregation service document 500, the user's responsive actions may then be identified (act 420). In one alternative, the user may click on or otherwise select one of the news content links 506 provided on news aggregation service document 500 and thereby navigate away from news aggregation service document 500. In this eventuality, server 220 may receive an indication from client 210 indicating the link 506 selected by the user as well as any relevant additional information, such as the time the selection was made, etc. (act 422). Server 220 may then store this indication in association with the user or with client 210 (act 424), so as to facilitate use of this information in accordance with the user's news viewing preferences, such as in act 408 described above. In this manner, previously accessed content may be removed from news aggregation service document 500 thereby increasing the "freshness" of the content.

Although described above as being stored on server 220, it should be recognized that previously accessed news content indications may be stored at server 220, at server 230, or at client 210 associated with the user, or at some combination of server 220, server 230, or client 210. To access such information, a "cookie," or an identifier contained in a "cookie" that is, in turn, mapped to the stored information, may be used in some implementations consistent with the principles of the invention. Following storage of the previously accessed news content indication, the process may then return to act 404 for subsequent requests for the news aggregation service document.

In an alternative implementation, removal of previously accessed content may be performed following a predetermined period of time from the initial news content access. In this manner, users desiring to access related news content included within the same grouping as the previously accessed news content may still be provided with the grouping. Following expiration of the predetermined time period (e.g., 1 hour), the content may be removed from subsequent presentations of news aggregation service document 500.

Returning to act 420, server 220 may receive a user selection of "remove" option 518 relating to a news content listing 504, category 514, or grouping 516 (act 426). In response, server 220 may store an indication of the user selection of the remove option 518 (act 428). The process may then return to act 414 where the remaining news content documents may be ranked in view of the received removal request. As described above, in one implementation consistent with principles of the invention, removal of a news content document may result in reduced importance or relevance being placed on related or similar news content documents.

Figure 6:
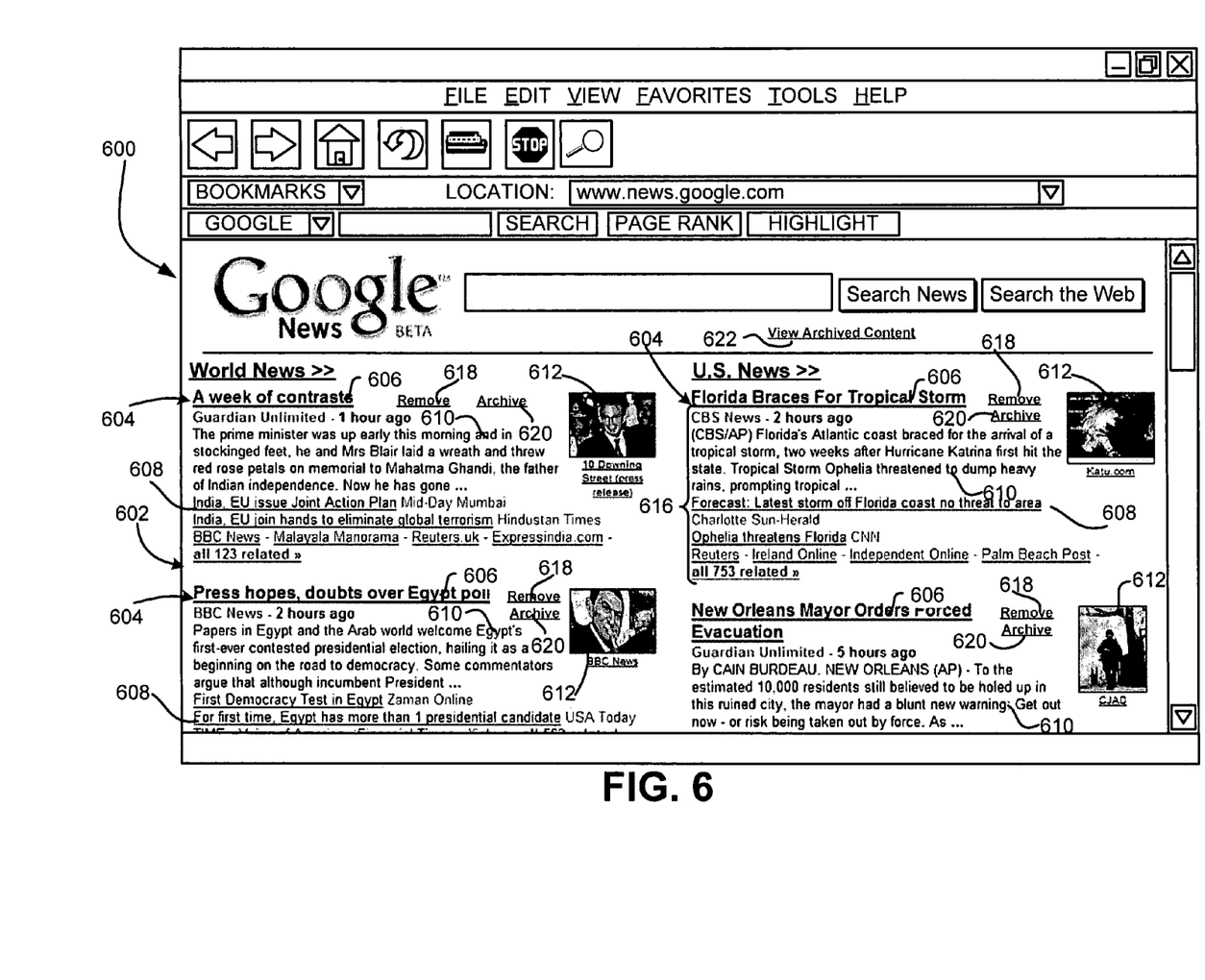
FIG. 6 is a diagram of an exemplary news aggregation service document according to another implementation consistent with the principles of the invention.

FIG. 6 is a diagram of another exemplary news aggregation service document 600 according to another implementation consistent with the principles of the invention. As with news aggregation service document 500 of FIG. 5, news aggregation service document 600 may include a set 602 of news content listings 604 matching the received criteria. Set 602 may include a series of hypertext links 606 associated with the identified news content listings 604 as well as headlines 608, snippets 610 and/or images 612 relating to listings 604. Furthermore, news aggregation service document 600 may also include a number of categories 614, and groupings 616 for presenting related news content listings together.

In addition to the above information, each news content listing 604, category 614, or grouping 616 provided on news aggregation service document 600 may also include a "remove" option 618 and/or an "archive" option 620. In accordance with principles of the invention, options 618 and 620 may be used to facilitate user-initiated refreshing of content listing 604. Upon receipt of a user selection of remove option 618, the system performs in a manner similar to that set forth above in FIG. 4. That is, the associated news content listing 604 is removed from news aggregation service document 600, and its removal is reflected in the ranking of available news content documents.

Alternatively, upon receipt of a user selection of archive option 620, the associated news content listing 604 is removed from news aggregation service document 600. However, in this case, in contrast to the "remove" option described above, the removal of the document is not considered in subsequent ranking of available news content documents. In this manner, the removal of a news content listing 604 that is not currently of interest, but that remains of general interest to the user, does not impact subsequent document rankings. Furthermore, in accordance with an implementation consistent with principles of the invention, previously "archived" news content listings may be presented to the user upon receipt of a user selection of a "view archived content" option 622. In this manner, news content listings 604 previously removed from news aggregation service document 600 may be re-presented to the user for subsequent selection.

In another implementation consistent with principles of the invention, news items may be removed or archived for a predetermined period of time. For example, upon selection of a suitable option (e.g., a "Remove for this session" option), a selected news item or grouping of news items may be removed from the news aggregation service document. Upon lapsing of the predetermined period of time, the removed stories may be re-inserted into the news aggregation service document. In this manner, news content may be customized in time, while enabling users to re-visit removed documents at a later time. In one example, the predetermined period of time may be a session time (where "session" may be defined as a sequence of queries or interactions by the same user). Other suitable time periods may include an hour, a day, etc.

In still another exemplary implementation consistent with principles of the invention, an "undo" option may be included for enabling users to undo or reverse recently performed removal or archiving operations. In one implementation, such an undo option would reverse the most recent listing removal selection. Alternatively, the undo option would reverse all removal operations during the current session.

Figure 7:
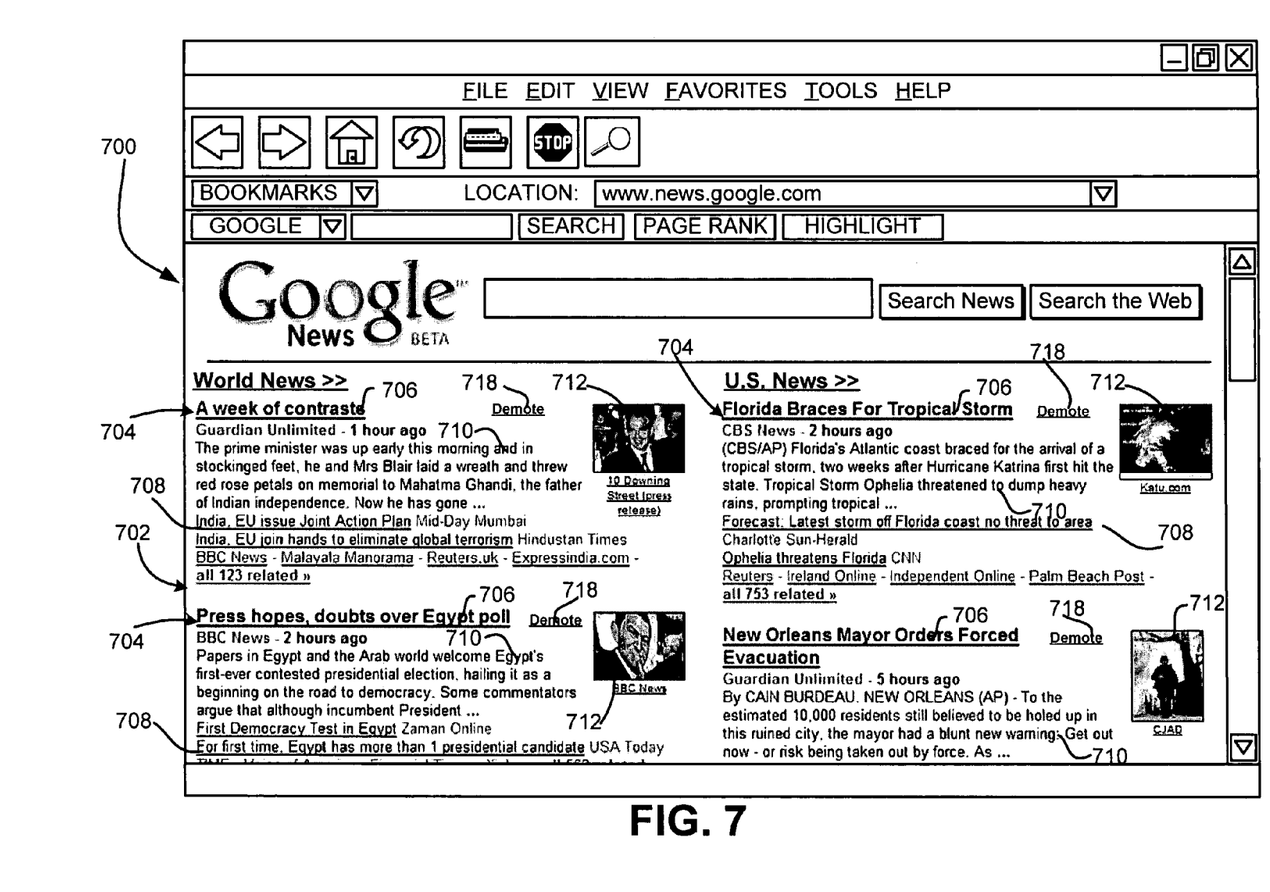
FIG. 7 is a diagram of an exemplary news aggregation service document according to yet another implementation consistent with the principles of the invention.

FIG. 7 is a diagram of an exemplary news aggregation service document 700 according to another implementation consistent with the principles of the invention. As with news aggregation service documents 500 and 600 of FIGS. 5 and 6, respectively, news aggregation service document 700 may include a set 702 of news content listings 704 matching any received criteria. Set 702 may include a series of hypertext links 706 associated with the identified news content listings 704 as well as headlines 708, snippets 710 and/or images 712 relating to listings 704. Each news content listing 704 provided on news aggregation service document 700 may also include a "demote" option 718. In accordance with principles of the invention, "demote" option 718 may be used to facilitate user-initiated re-sorting or re-ranking of set 702. Upon receipt of a user selection of "demote" option 618, the system may demote or otherwise reduce the ranking of the associated listing 704. This may result in the listing 704 being removed from the set 702 presented to the user on news aggregation service document 700. However, rather than eliminate the associated listing 704 from potential presentation, the listing is demoted in ranking. In this manner, subsequent requests for news content listings related to the associated listing would result in the re-presentation of listing 704. In an additional implementation, demotion of the listing 704 may be considered during subsequent user requests for the news aggregation service document.

Conclusion

Systems and methods consistent with the principles of the invention may facilitate user interaction with a news aggregation service, to thereby improve the freshness and quality of the presented content. Based on user selections, presented news content listings or groups of listings may be removed from the presented content. Furthermore, user actions may be used to facilitate subsequent ranking and presentation of additional news content listings.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4A and 4B, the order of the acts may be modified in other implementations consistent with the principles of the invention. Also, non-dependent acts may be performed in parallel. Additionally, although options relating to removal, archiving, and demotion have each been set forth in detail above, each of these options may be commonly referred to as "removing" news listings, for the purposes of the invention.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise

What is claimed is:

1. A method comprising:
fetching, by one or more processors, news content from a plurality of news sources;
aggregating, by one or more processors, the news content, the aggregated news content including a plurality of news items;
providing for presentation, by one or more processors, the aggregated news content to a user device;
receiving, by one or more processors, a request to remove a particular news item, of the plurality of news items, from the aggregated news content;
removing, by one or more processors, the particular news item and similar news items, of the plurality of news items, with content similar to content of the particular news item from the aggregated news content;
retrieving, by one or more processors, one or more replacement news items to replace the particular news item and the similar news items;
creating, by one or more processors, updated aggregated news content by replacing the particular news item and the similar news items with the one or more replacement news items; and
providing for presentation, by one or more processors, the updated aggregated news content to the user device.

2. The method of claim 1, where fetching the news content from the plurality of news sources comprises:
receiving a request to access the aggregated news content; and
fetching the news content from the plurality of news sources based on the request to access the aggregated news content.

3. The method of claim 2, where the request to access the aggregated news content includes one or more search queries.

4. The method of claim 2, where the request to access the aggregated news content includes a request for a news aggregation service document.

5. The method of claim 2, where the news content is provided for presentation in a document from a news aggregation service.

6. The method of claim 1, further comprising:
ranking the aggregated news content; and
providing information identifying particular news content, of the aggregated news content, to the user device based on the ranking.

7. The method of claim 6, comprising:
determining an updated ranking of the updated aggregated news content; and
presenting other news content, of the updated aggregated news content, to the user device based on the updated ranking.

8. The method of claim 1, further comprising:
identifying news content that has been previously accessed; and
removing the previously accessed news content from the aggregated news content.

9. The method of claim 8, further comprising:
determining a ranking of the aggregated news content based on the previously accessed news content; and
providing, for presentation, portions of the aggregated news content to the user device based on the ranking.

10. The method of claim 1, where the request to remove the particular news item is a request for archival of the particular news item.

11. The method of claim 10, further comprising:
determining a ranking of the aggregated news content based on the archival of the particular news item; and
providing, for presentation, portions of the aggregated news content to the user device based on the ranking.

12. The method of claim 1, where the similar news items include news items that relate to a same topic as the particular news item.

13. A system, comprising:
a news aggregation server, including a memory, to:
identify news content from a plurality of news source servers based on a request received from a user device,
create a news aggregation document based on the identified news content,
the identified news content including a plurality of news items,
receive a request to remove a particular news item, of the plurality of news items, from the news aggregation document,
remove the particular news item and similar news items, of the plurality of news items, with content similar to content of the particular news item from the news aggregation document based on the request to remove the particular news item,
retrieve one or more replacement news items to replace the particular news item and the similar news items,
create an updated news aggregation document by replacing the particular news item and the similar news items with the one or more replacement news items, and
provide, for presentation, the updated news aggregation document.

14. The system of claim 13, where the news aggregation server is further to:
determine a ranking for the identified news content, and
provide, for presentation, news content identified in the news aggregation document based on the ranking.

15. The system of claim 14, where the news aggregation server is further to:
determine an updated ranking based on removing the particular news item from the news aggregation document, and provide, for presentation, updated news content identified in the updated news aggregation document based on the updated ranking.

16. The system of claim 13, where the news aggregation server is further to automatically remove previously accessed news content from the news aggregation document.

17. The system of claim 16, where the news aggregation server is further to:
determine a ranking for the news content based on the previously accessed news content; and
provide, for presentation, updated news content in the updated news aggregation document based on the ranking.

18. The system of claim 13, where the removal of the similar news items occurs following a predetermined period of time from a time of a previous accessing of the particular news item.

19. The system of claim 18, where the removal of the similar news items occurs for a predetermined period of time from a time of a previous accessing of the particular news item.

20. The system of claim 13, where the request to remove the particular news item is a request for archival of the particular news item.

21. The system of claim 20, where the news aggregation server is further to:
determine a ranking for the news content based on the archival of the particular news item; and
provide, for presentation, particular news content identified in the updated news aggregation document based on the ranking.

22. The system of claim 13, where the request to remove the particular news item is a request to demote the particular news item.

23. The system of claim 22, where the news aggregation server is further to:
determine a ranking for the news content based on the demotion of the particular news item; and
provide, for presentation, particular news content identified in the updated news aggregation document based on the ranking.

24. A news aggregation server, comprising:
a memory to store instructions and news content; and
a processor to execute the instructions in memory to:
index news content from a number of different news source servers, receive a request, from a user device, for a news aggregation document, aggregate news content from the memory based on the received request,
the news content including a plurality of news items,
provide, for presentation, the aggregated news content to the user device in the news aggregation document,
receive a request to remove a selected news item, of the plurality of news items, from the news aggregation document,
remove the selected news item and news items, of the plurality of news items, with content similar to content of the selected news item from the news aggregation document based on the request to remove the selected news item,
retrieve one or more replacement news items, from the memory, to replace the removed selected news item and the news items with content similar to the content of the selected news item,
create an updated news aggregation document by replacing the removed selected news item and the removed news items with content similar to the content of the selected news item with the one or more replacement news items, and
provide, for presentation, the updated news aggregation document to the user device.

25. The news aggregation server of claim 24, where the processor is to:
rank the plurality of news items in the aggregated news content based on the received request for the news aggregation document,
provide, for presentation, the ranked plurality of news items in the news aggregation document,
re-rank particular news items, of the plurality of news items, in the updated news aggregation document based on the request to remove the selected news item, and
provide, for presentation, the re-ranked particular news items in the updated news aggregation document to the user device.

* * * * *